June 23, 1936.  T. ZUSCHLAG  2,045,258
ELECTRICAL ANALYSIS (APPARATUS)
Filed April 3, 1933
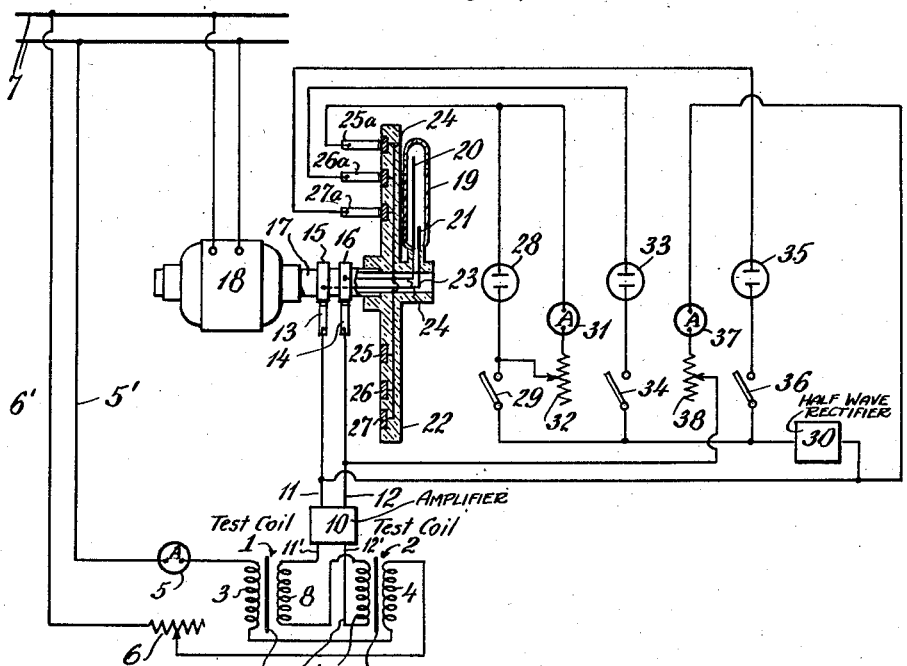
Fig. 1.
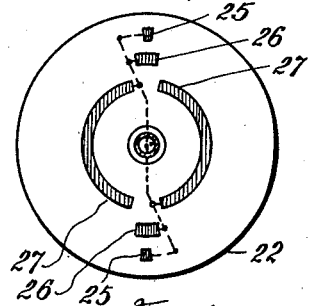
Fig. 2.
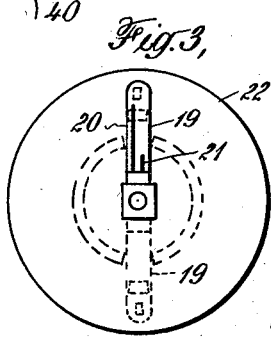
Fig. 3.
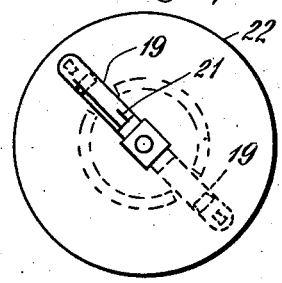
Fig. 4.
Fig. 5.
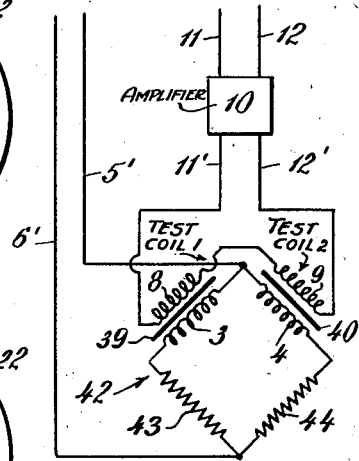
Fig. 6.
INVENTOR
Theodor Zuschlag
BY
Pennie, Davis, Marvin Edmonds
ATTORNEY Patented June 23, 1936

2,045,258

UNITED STATES PATENT OFFICE 2,045,258

ELECTRICAL ANALYSIS (APPARATUS)

Theodor Zuschlag, Englewood, N. J., assignor to Magnetic Analysis Corporation, Long Island City, N. Y., a corporation of New York Application April 3, 1933, Serial No. 664,164

20 Claims. (Cl. 175—183)

This invention relates to electrical analysis and has for its object certain improvements in the method of and apparatus for visually indicating the characteristics of electrical phenomena, particularly alternating current and voltage. The invention contemplates more especially improvements in the art for indicating amplitude and phase variations of alternating current phenomena.

In magnetic analysis comparative tests are conducted to determine the instantaneous magnetic relationship between a specimen to be tested and a standard, as reflected in the magnitude and other characteristics of a secondary current induced in suitable secondary coils by the flux set up in the specimen by appropriate primary coils, all constants being equal except the magnetic properties of the standard and the specimen. In case the magnetizing current is periodic, each cycle produces a corresponding cycle of induced current in the exploring secondary coils of the testing apparatus; and when the secondary coils are arranged in opposed relationship, the induced differential current will have certain characteristics depending on variations of the specimen from the standard with respect to their magnetic properties.

To make a magnetic analysis of this kind, a standard and a specimen are respectively placed in the fields of a pair of separate primary coils energized by a common alternating current source. A secondary coil is disposed in inductive relation to each of the primary coils, as by locating the secondary coil within the primary coil, and the two secondary coils are connected in series in such a manner that opposed electromotive forces are induced therein by the flow of primary current. The standard and the specimen are thus simultaneously subjected to a magnetizing force. If the magnetic properties of the standard and the specimen are exactly the same, there is no resultant measurable electrical effect in the secondary coils. If, however, the magnetic properties of the standard and the specimen are not the same, differential secondary currents are induced in the circuits of the secondary coils. The properties of these differential currents are utilized to disclose the character and extent of the variation or difference between the standard in one magnetic field and the specimen in the other magnetic field. With the aid of suitable means, an image representing the wave form of current induced in the secondary coils may be visually produced. In accordance with United States Patent No. 1,813,746 such images may be produced for visual inspection more particularly by an oscillograph. Certain variations in the contour of the wave are indicative of certain chemical and/or physical properties of the specimen.

Moving coil oscillographs have been proposed to obtain a visual representation of a current wave, in magnetic analysis of the kind described as well as in other forms of alternating current analysis. These oscillographs are relatively delicate and complicated instruments, and are therefore not well suited for other than laboratory work. They must be handled with extreme care, usually by skilled operators, and are therefore not well suited for rough field work by unskilled operators.

In my copending application, Serial No. 627,748, filed August 6, 1932, now Patent 1,964,776, I have disclosed and claimed a method of and apparatus for indicating visually the characteristics of alternating current and voltage phenomena which offer important advantages over the oscillograph. They involve the use of a suitable glow tube, one filled with an inert gas, that is rotated about an axis, preferably passing perpendicularly through or near the base of its electrodes, the rotation of the tube being effected by the shaft of a synchronous motor in operative association, for example, with a Wheatstone bridge network, both of which are electrically energized by the same alternating current source. An alternating potential is impressed across the terminals of the electrodes of the tube when the bridge network is not in balance. The tube is thus made to glow and throws upon a graduated screen a picture of a composite wave curve. The various value variations occurring during one cycle of the investigated current are broken up into successive instantaneous time components that are visually represented by the ray picture.

A single composite ray picture of this kind yields highly important analytical data. The interpretation of the characteristics of a current or voltage composite ray picture or wave curve, however, is somewhat limited by the nature of the glow tube. It is also inherently difficult to account for a plurality of irregularities in a single composite picture or curve.

The electrodes of the glow tube will promptly cause a glow when the magnitude of the impressed voltage is sufficient to cause current to be passed by the tube. Such glowing of the tube, moreover, takes place independent of the amount of electromotive force impressed across the electrode terminals, provided merely that a sufficient amount is impressed to cause an initial glow in the tube. In other words, the mere glowing of the tube is of itself not an accurate indication of the amount of potential impressed across the electrodes, particularly when the amount of potential is more than enough to make the tube glow. It is therefore difficult to estimate the relative magnitude of the harmonics, represented by the wave curve on the screen.

Difficulties of this kind are encountered when investigating amplitude and phase variations of complex alternating currents. This is particularly true in the field of magnetic testing or analysis, when studying the chemical and/or physical characteristics of metal articles or objects composed of magnetizable material. Certain chemical and physical characteristics of such articles will under certain conditions produce a unique and characteristic alteration in the response of the article to the application of magnetic force. Variations in magnetic effect due to variations in the chemical and/or physical properties of the article are manifested in a comparison of the shapes of magnetization curves.

The apparatus and methods heretofore proposed, however, break up the various value variations occurring during one cycle of the investigated current into successive instantaneous time components. The analysis and interpretation of such variations, or of the curves representing the variations, are a complicated task. Every value variation changes the form of the curve, or changes the configuration of the successive phase components; and thus produces a continuously weaving, highly irregular, image; the correct interpretation of which is extremely difficult; even for a skilled operator.

As a result of my investigations, I have determined a method of and apparatus for such electrical analysis according to which these difficulties may be largely overcome. Instead of producing a single composite curve to give a visual representation of a plurality of instantaneous value variations, I am able to obtain a selective representation of predetermined time or phase components and thereby make possible a selective analysis of the current under investigation. Such a selective representation, which may be inspected by the eye, aids materially in simplifying the analysis; and accounting for the changes in value variations. This analysis may be readily and simply obtained, so that a skilled operator is not required. The apparatus employed, furthermore, is rugged and adapted to open shop use.

In investigating certain properties of magnetizable material I find that they generally cause value variations at certain well defined points in each phase cycle. By restricting observations to these particular points in each phase cycle, it is possible to decrease materially minor or otherwise undesirable value variations to an extent which permits a substantially automatic solution of many complex testing problems, particularly those relating to magnetic analysis.

A further understanding of the present invention may be obtained by referring to the accompanying drawing, taken in conjunction with the following description, in which:

Fig. 1 diagrammatically illustrates an apparatus according to a practice of the invention;

Fig. 2 is an enlarged detail of the arrangement of the contact segments in the rotating disc shown in Fig. 1;

Figs. 3, 4 and 5 are views similar to Fig. 2 but showing different positions of the rotating glow tube of Fig. 1; and Fig. 6 diagrammatically illustrates a modified arrangement involving a Wheatstone bridge network.

The apparatus shown is particularly adapted for the purpose of selective magnetic testing or analysis; although it will of course be clear to those skilled in this art that the apparatus contemplated, in whole or in part, is adapted for a variety of other practical uses in electrical analysis.

Referring to Fig. 1, a pair of so-called test coils 1 and 2 comprise primary coils 3 and 4 connected in series with an ammeter 5 and a variable resistance 6 by means of leads 5' and 6', respectively, to a main alternating current supply line 7. A pair of opposed secondary coils 8 and 9 are inductively located in the respective fields of the primary coils, a secondary coil being positioned in a primary coil in each instance. The secondary coils are connected in series opposition by means of leads 11' and 12', respectively, to an amplifier 10. The amplifier may include a filter circuit arrangement which permits the passage of only one, preferably the base, frequency. The output leads 11 and 12 of the amplifier are connected to stationary brushes 13 and 14, which engage contact rings 15 and 16 secured to the shaft 17 of a synchronous motor 18 energized by current from the line 7.

A neon or other inert gas tube 19, provided with interior electrodes 20 and 21, is mounted on a disc 22 fastened to the end of the shaft 17. Electrode 20 is substantially longer than electrode 21. The base of the electrodes is preferably at or near the axis of the shaft. The tube is electrically connected to the contact rings 15 and 16 by means of leads 23 and 24, respectively. A current passes through the conducting neon gas when a sufficient voltage is impressed across the terminals of the tube electrodes, which causes a glow along one or the other of the electrodes, according to the direction of the current through the tube.

During one-half cycle of an alternating current wave, electrode 20 will be positive with respect to electrode 21; and during the other half cycle the polarity of the impressed voltage will be in the opposite direction. During that part of each half cycle when the magnitude of the impressed voltage is sufficient to cause current to be passed by the tube, a glow will appear along whichever electrode is negative with respect to the other; the length of the glow along the respective electrodes depending upon the intensity of the current, and its duration upon the relation between the minimum voltage required to pass current and the maximum or peak value of the wave.

Due to the shortness of electrode 21, the glow appearing during any portion of the half cycle when that electrode is at a lower potential then electrode 20 will be of such short length as to appear only as a spot of light adjacent the center of rotation of the tube. During the other half cycle, assuming the tube to be rotated in fixed time relation to the fundamental frequency of the impressed voltage, a glow of considerable extent will appear along long electrode 20 when the impressed voltage approaches its peak value; which glow, appearing twice each revolution, will, due to the persistence of vision, appear as fixed radial glows against disc 22; if an 1800 R. P. M. synchronous motor is used, and a 60 cycle alternating current is impressed on the tube electrodes.

This glow may be considered, for example, as being fixed in a vertical direction (see Fig. 3) when the current passing through the electrodes has a frequency corresponding to the fundamental frequency of the main energizing current in the leads 7.

If, however, the voltage wave impressed across the terminals of the electrodes 20 and 21 is a complex wave, then a series of oppositely disposed radial glows corresponding to twice the number of the harmonics present in the impressed voltage may be observed against disc 22. In magnetic testing odd harmonics are more important than even harmonics; and generally yield more useful information than even harmonics.

Furthermore, if the voltage impressed across the terminals of the electrodes 20 and 21 is out of phase with that impressed across the terminals of the synchronous motor 18, which fixes the rate of rotation of the tube 19, that fact is immediately made apparent by a rotational shift in the ray picture observed against the disc 22.

Contact ring 16 is in turn by means of lead 24a connected with metal contacts 25, 26 and 27 mounted on disc 22 at suitably spaced intervals. The arrangement of the three metal contacts is illustrated in detail in Fig. 2; it will be noted that the neon tube 19 is on one side of the disc 22, while the contacts 25, 26 and 27 are on the opposite side of the disc. In the case of an 1800 R. P. M. synchronous motor, one-half revolution of the shaft and disc corresponds to a phase shift of 360° of the tube energizing current, the tube being energized by a 60 cycle alternating current. The three contacts preferably consist of three pairs of metallic segments, each pair being separated in equally spaced directly opposite relationship on the same side and from the axis of the disc, as shown. In the instant case, the width of segments 25 is about 2°, that of segments 26 is about 5°, and that of segments 27 is about 170°. The last pair of segments 27 are displaced 90° against segments 25 and 26, leaving an open space directly below (or above, as the case may be) the segment 26. The tube 19 is mounted in such a way, as shown, as to be aligned with the space between the ends of the pair of segments 27 and to extend across the segments 26 and 25.

The pair of segments 25 are contactable with a movable brush 25a, which is connected to a stationary glow tube 28 of lower electric resistance than the rotatable neon glow tube 19. The circuit is completed by a switch 29 in series with a half-wave rectifier 30, permitting the passage of current in one direction only, connected to the output lead 11 of the amplifier. The stationary glow tube 28 is shunted by a direct current milliammeter 31 in series with a variable resistance 32.

In a similar manner, the pair of segments 26 are contactable with a movable brush 26a, which is connected to a stationary glow tube 33 of lower electric resistance than the rotatable neon glow tube 19. The circuit is completed by a switch 34 in series with the half-wave rectifier 30.

The pair of segments 27 are contactable with a movable brush 27a, which is connected to a stationary glow tube 35 of lower electric resistance than the rotatable neon glow tube 19. The circuit is completed by a switch 36 in series with the half-wave rectifier 30.

The R. M. S. (root mean square) value of the output of the amplifier 10 is ascertainable by a milliammeter 37 in series with a variable resistance 38 connected across the output leads 11 and 12 of the amplifier.

The above described apparatus may be operated as follows in a practice of the invention:

Two bars of steel, a standard 39 and a specimen 40, having substantially the same magnetizable properties, are inserted in the test coils 1 and 2, respectively. Switches 29, 34 and 36 are open. The primary coils 3 and 4 are energized by an alternating current from the line 7, thereby setting up magnetic fluxes in the standard and the specimen; while the synchronous motor 18 is energized from the same source, causing a simultaneous rotation of the shaft 17, the glow tube 19 and the disc 22. Opposed currents are induced in the secondary coils 8 and 9. If the two bars of steel are exactly alike in their magnetic properties, the currents induced in the opposed secondary coils 8 and 9 tend to neutralize one another, and there is no flow of current to the rotating tube 19; and hence no glow of the tube.

No two pieces of steel are, however, exactly alike in their magnetic properties, so that the amount of current induced in the respective secondary coils 8 and 9 are not equal and there is a flow of current to the filter amplifier 10. If, therefore, switches 29, 34 and 36 are open, the rotating tube 19 will glow generally at a certain phase angle (see Fig. 3); because the amplified and filtered current due to even a slight difference of the magnetic fluxes in the two test coils is in most instances sufficient to light the tube. If, now, brush 27a is moved to the phase position of this glowing ray, indicated by the position of the glowing tube with respect to the disc 22, and switch 36 is closed, no change is noticeable. That is to say, rotating tube 19 will continue to glow in its radial position as indicated; but stationary tube 35 will not glow. This is due to the fact that the brush 27a is so disposed as to be out of contact with its contact segments 27 at the point during the rotation of the disc when these segments are energized; and current does not, therefore, pass between the brush and the tube 35. The device may now be considered as being calibrated and ready for testing service. For convenience, the balance just discussed may be characterized as a predetermined "normal" condition.

Assuming, next, that the specimen 40 of bar steel in test coil 2 is replaced by another specimen 40a of different magnetic properties, the differences between the voltages induced in the secondary coils 8 and 9 will shift to another phase position. The rotating tube will not then glow in its former radial position; but the stationary tube 35 will glow. This is due to the fact that the brush 27a is then so disposed as to be in contact with its contact segments 27 at the point during the rotation of the disc when these segments are energized; and current does, therefore, pass between the brush and the tube 35. Since the resistance of the stationary tube is of lower value than that of the rotating tube, the shunting of the stationary tube across the energizing circuit of the rotating tube will prevent the lighting-up of the rotating tube at any other phase position except that of the original radial position, discussed above, where the gap between the contact segments 27 disconnects the stationary tube from the energizing circuit. In this way, the combination may be used to indicate all variations from a predetermined "normal" condition.

With the standard 39 and the specimen 40a still in their respective test coils, if switch 36 is opened, stationary tube 35 is cut out of the circuit and the rotating tube may again glow. If brush 26a is next shifted to the new radial position (Fig. 4) of the glowing rotating tube, and switch 34 is then closed, stationary tube 33 will glow. This is due to the fact that the brush 26a is so disposed as to be in contact with its contact segments 26 at the point during the rotation of the disc when these segments are energized; and current does, therefore, pass between the brush 26a and the tube 33. Since this stationary tube has a lower resistance than the rotating tube, it will totally or partially extinguish the glow of tube 19, depending upon the widths of this glow with relation to the widths of contact segments 26. Assuming further that specimen 40a is characterized by a defect such as, for instance, a crack, then stationary tube 33 in the circuit of contact segments 26 will continue to glow only so long as this particular defect is exposed to the action of the test or exploring coil 2; provided of course that the other magnetism affecting properties remain constant. In other words, while the first stationary tube 35 indicates all variations from a predetermined standard of a specimen under investigation, the second stationary tube or lamp 33 will indicate only one specific variation, such as that occasioned, for instance, by a crack in the specimen.

In testing steel bars in this manner, it has been found that seams frequently do not produce such a complete shifting of phase as is necessary to light tube 33. In many cases a slight phase twist or shift of the "normal" indication is the only noticeable feature (see Fig. 5 and compare with Fig. 3). Yet observing the direction of this shift, moving brush 25a to a slightly leading or lagging position, as the case may be, with regard to the normal indication, opening switches 34 and 36, and closing switch 29, it is possible to ascertain the existence of such small phase shifts either by observing the third stationary glow tube 28, or noting the deflection of meter 31. This is due to the fact that the brush 25a is so disposed as to be in contact with its contact segments 25 at the point during the rotation of the disc when these segments are energized; and current does, therefore, pass between the brush 25a and the tube 28, or the meter 31. Since this stationary tube has a lower resistance than the rotating tube, it will totally or partially extinguish the glow of tube 19, depending upon the widths of this glow with relation to the widths of contact segments 25. Assuming then, that specimen 40a is characterized by a defect such as a seam, for example, then stationary tube 28 in the circuit of contact segments 25 will continue to glow only so long as this particular defect is exposed to the action of the test or exploring coil 2; provided of course that the other magnetizing affecting properties remain the same.

According to the procedure just outlined, it will be noted that tube 35 indicates all variations in the specimen that affect its magnetic properties; and that tubes 33 and 28 indicate or analyze specific variations in the specimen that affect its magnetic properties, the phase locations of which are indicated by the radial positions in which rotating tube 19 glows.

Proceeding in this manner, the apparatus indicates not only all general but also certain variations in the properties of a test specimen; particularly as compared with a given standard. Each variation is reflected by an instantaneous phase component in the secondary or differential current. The phase component for each such variation is in turn reflected by a glow of the rotating tube at a certain fixed radial location. Advantage is taken of the phenomenon whereby the effect of each such variation is selectively isolated and presented for separate view. For convenience, this step may be characterized as producing for inspection predetermined instantaneous phase components of said secondary current. In other words, after the apparatus has been adjusted for a specific problem, magnetic testing may be carried out by simply observing the glows of lamps 28, 33 and 35. It further is possible to replace the three stationary glow lamps by other suitable indicating devices such as, for instance, paint spraying relays, or relay operated selector combinations.

The same apparatus may be used for other types of magnetic testing as may readily occur to one skilled in the art. In this connection may be mentioned the sorting out of bars of different chemical analysis, different carbon content or different heat treatment. The specimen to be tested may be progressively advanced through its test coil while the testing operation takes place.

A modified form of apparatus is shown in Fig. 6, involving a Wheatstone bridge network 42 substituted for the primary coils of Fig. 1. The bridge shown comprises a pair of primary coils 3 and 4 and a pair of resistances 43 and 44. The coils and the resistances are connected in parallel with the mains 7 by the leads 5' and 6'. A pair of secondary coils 8 and 9 in straight (non-opposed) series are associated with the primary coils 3 and 4, respectively. Currents induced in the secondary coils will be in opposition because of the opposed direction of the current that passes through the primary coils 3 and 4. As in the arrangement previously described, the secondary coils are connected by means of leads 11' and 12' to the indicating means. It will be clear that this modified form of apparatus may be operated substantially like that of Fig. 1.

It is also possible in certain types of magnetic investigations to cut out the amplifier 10 altogether by connecting leads 11' and 12' directly to brushes 13 and 14. In this case the energy of the resultant secondary current generally will not be sufficient to light the glow tubes 19, 28, 33 and 35. Replacing glow tubes 33 and 35 by other suitable indicating instruments, such as sensitive microammeters, the same operations may be carried out and the same testing procedure followed as described for the original arrangement of Fig. 1.

Practical experiments carried out with this apparatus have demonstrated the possibility of carying through magnetic testing on a more or less automatic basis, thereby eliminating the necessity of continuous oscillograph observations and the difficulty of interpreting such observations. Certain refinements or simplifications of the apparatus, and other applications in the use of the apparatus, may easily occur to one skilled in the art of electric measurements without, however, departing from the fundamental principles of the invention.

I claim:

1. In an apparatus for testing a magnetizable body, the improvement comprising in combination a primary magnetizing circuit to establish a magnetic flux in the body to be tested, a secondary circuit inductively in association with said primary circuit adapted to receive an induced dfferential current through said body and containing a rotatable current indicating means, at least one tertiary circuit connectable in parallel with said secondary circuit and containing an indicating device adapted to produce separately for inspection at least one predetermined instantaneous point in each phase cycle of the secondary current and means for interrupting a contact between the secondary and tertiary circuits during a portion of each phase cycle of the secondary current.

2. An apparatus for testing a magnetizable body according to claim 1, in which the tertiary circuit includes an indicating device for each predetermined point to be separated.

3. An apparatus for testing a magnetizable body according to claim 1, in which the secondary circuit inductively in association with said primary circuit adapted to receive an induced differential current is provided with a glow tube securely mounted on the shaft of a synchronous motor.

4. An apparatus for testing a magnetizable body according to claim 1, in which the secondary circuit inductively in association with said primary circuit adapted to receive an induced differential current is provided with a glow tube securely mounted on the shaft of a synchronous motor adjacent a disc likewise mounted on said shaft.

5. An apparatus for testing a magnetizable body according to claim 1, in which the secondary circuit inductively in association with said primary circuit adapted to receive an induced differential current is provided with a glow tube securely mounted on the shaft of a synchronous motor, a continuous circuit being maintained by means of a pair of spaced contact rings on the shaft, each ring being contacted by a separate brush.

6. An apparatus for testing a magnetizable body according to claim 1, in which the tertiary circuit connectable in parallel with said secondary circuit is provided with a disc securely mounted on the shaft of a synchronous motor, the disc in turn being provided with at least one contact segment in series with the tertiary circuit.

7. An apparatus for testing a magnetizable body according to claim 1, in which the tertiary circuit connectable in parallel with said secondary circuit is provided with a disc securely mounted on the shaft of a synchronous motor, the disc in turn being provided with a plurality of pairs of metallic segments, each pair of segments being separated in equally spaced directly opposite relationship on the same side and from the axis of the disc.

8. An apparatus for testing a magnetizable body according to claim 1, in which the tertiary circuit connectable in parallel with said secondary circuit is provided with a disc securely mounted on the shaft of a synchronous motor, the disc in turn being provided with a plurality of pairs of metallic segments, each pair of segments being separated in equally spaced directly opposite relationship on the same side and from the axis of the disc, one of said pairs of metallic segments being displaced 90° against the other pair or pairs of metallic segments.

9. An apparatus for testing a magnetizable body according to claim 1, in which the tertiary circuit connectable in parallel with said secondary circuit is provided with a disc securely mounted on the shaft of a synchronous motor, the disc in turn being provided with a plurality of pairs of metallic segments, each pair of segments being separated in equally spaced directly opposite relationship on the same side and from the axis of the disc, one of said pairs of metallic segments being displaced 90° against the other pair or pairs of metallic segments, and a glow tube mounted on the shaft to fit opposite the open space between adjacent ends of said 90° displaced metallic segments.

10. An apparatus for testing a magnetizable body, according to claim 1, in which the tertiary circuit connectable in parallel with said secondary circuit is provided with a disc securely mounted on the shaft of a synchronous motor, the disc in turn being provided with at least one contact segment in series with the tertiary circuit, said contact segment being connected with an electrode of a glow tube mounted on the shaft of the motor.

11. An apparatus for testing a magnetizable body, according to claim 1, in which the tertiary circuit connectable in parallel with said secondary circuit is provided with a disc securely mounted on the shaft of a synchronous motor, the disc in turn being provided with at least one contact segment in series with the tertiary circuit, each segment being in turn connectable by means of a movable contact brush to an indicating device.

12. An apparatus for testing a magnetizable body according to claim 1, in which the tertiary circuit connectable in parallel with said secondary circuit is provided with a disc securely mounted on the shaft of a synchronous motor, the disc in turn being provided with a plurality of pairs of metallic segments, each pair of segments being separated in equally spaced directly opposite relationship on the same side and from the axis of the disc, each pair of metallic segments being in turn connectable by means of a separate movable contact brush to a separate indicating device.

13. An apparatus for testing a magnetizable body according to claim 1, in which the tertiary circuit connectable in parallel with said secondary circuit is provided with a disc securely mounted on the shaft of a synchronous motor, the disc in turn being provided with a plurality of pairs of metallic segments, each pair of segments being separated in equally spaced directly opposite relationship on the same side and from the axis of the disc, each pair of metallic segments being in turn connectable by means of a separate movable contact brush to a separate indicating device including a stationary glow tube.

14. An apparatus for testing a magnetizable body according to claim 1, in which the tertiary circuit connectable in parallel with said secondary circuit is provided with a disc securely mounted on the shaft of a synchronous motor, the disc in turn being provided with a plurality of pairs of metallic segments, each pair of segments being separated in equally spaced directly opposite relationship on the same side and from the axis of the disc, each pair of metallic segments being in turn connectable by means of a separate movable brush and forming separable tertiary circuits with said secondary circuit.

15. In an apparatus for testing a magnetizable body, the improvement comprising in combination a primary magnetizing circuit to establish a magnetic flux in the body to be tested, a secondary circuit inductively in association with said primary circuit adapted to receive an induced differential current through said body, and at least one tertiary circuit connectable in parallel with said secondary circuit adapted to produce for separate inspection at least one predetermined instantaneous phase component of the secondary current, a half-wave rectifier being placed in said tertiary circuit.

16. In an apparatus for testing a magnetizable body, the improvement comprising in combination a primary magnetizing circuit to establish a magnetic flux in the body to be tested, a secondary circuit inductively in association with said primary circuit adapted to receive an induced differential current through said body, and at least one tertiary circuit connectable in parallel with said secondary circuit adapted to produce for separate inspection at least one predetermined instantaneous phase component of the secondary current, said secondary circuit being provided with a variable resistance and an ammeter in parallel arrangement.

17. In an apparatus for testing a magnetizable body, the combination comprising a test coil with a primary connectable with a source of primary current, said test coil being provided with a secondary in circuit with the electrodes of a rotatable glow tube, a device for rotating said tube in fixed time relation to the frequency of the primary current, and an indicator in circuit with said secondary coil and said rotatable glow tube to produce for separate inspection at least one predetermined phase component of a secondary current.

18. In an apparatus for making an analysis of alternating current, the improvement comprising in combination a primary circuit adapted to be energized by a primary alternating current, a secondary circuit adapted to receive secondary current induced by said primary circuit, a plurality of tertiary circuits connectable in parallel with said secondary circuit each of which is adapted to produce for separate inspection a predetermined phase component of the secondary current.

19. In an apparatus for magnetic analysis the combination which comprises a secondary circuit adapted to carry an induced alternating current and containing a rotatable glow tube, means for rotating the rotatable glow tube in synchronism with the alternating current, a tertiary circuit containing another glow tube, a rotatable contact means for establishing intermittent contact between the secondary and tertiary circuits and means for rotating the contact means in synchronism with the rotatable glow tube.

20. In an apparatus for magnetic analysis having a primary circuit adapted to carry a primary exciter alternating current and a secondary circuit inductively associated with the primary circuit and adapted to carry an induced alternating current, the combination which comprises a rotatable glow tube connected to the secondary circuit, a tertiary circuit containing current indicating means, a rotatable disk connected to the tertiary circuit having metallic contact segments disposed thereon and adapted to establish intermittent contact between the secondary and tertiary circuits, and means for rotating the disk and the glow tube.

THEODOR ZUSCHLAG.